United States Patent [19]

Rubio

[11] 4,175,951
[45] Nov. 27, 1979

[54] METHOD AND APPARATUS FOR PREPARING A REDUCING GAS STREAM

[75] Inventor: Charles A. Rubio, Houston, Tex.

[73] Assignee: CVG-Siderurgica del Orinoco, C.A., Venezuela

[21] Appl. No.: 904,977

[22] Filed: May 11, 1978

[51] Int. Cl.² ............................................. C22B 5/12
[52] U.S. Cl. ........................................ 75/91; 75/35; 266/140; 432/222
[58] Field of Search .......................... 75/26, 34–38, 75/91; 266/138, 140; 432/222

[56] References Cited
U.S. PATENT DOCUMENTS

| | | | |
|---|---|---|---|
| 3,128,174 | 4/1964 | Celada | 266/140 |
| 4,069,020 | 1/1978 | Bond | 432/222 |

Primary Examiner—M. J. Andrews
Attorney, Agent, or Firm—Pravel, Gambrell, Hewitt, Kirk, Kimball & Dodge

[57] ABSTRACT

A method and apparatus for preparing a hot reducing gas for introduction into a vessel containing ore oxide in order to react with the ore oxide to produce reduced metal including the steps of combusting a fuel with no more than a stoichiometric amount of air to produce a heating gas having an absence of available oxygen, mixing the heating gas with an initially preheated reducing gas stream in order to heat the initially preheated reducing gas stream without spending any of the reducing strength thereof and further to mixing such air and fuel to produce a heating gas which will cause the formation of additional reducing constituents.

11 Claims, 4 Drawing Figures

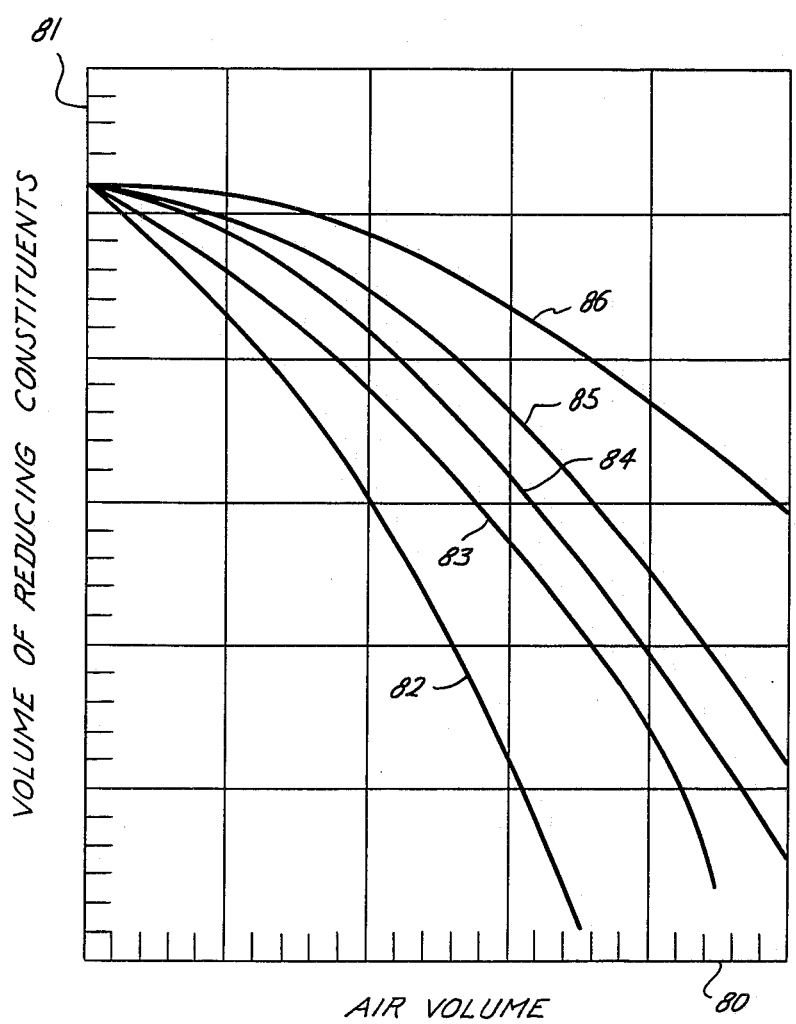

METHOD AND APPARATUS FOR PREPARING A REDUCING GAS STREAM

BACKGROUND OF THE INVENTION

The field of this invention is the production of sponge metal from ore oxides, and in particular, the preparation of a hot reducing gas stream utilized to reduce a material such as iron ore.

The concept of passing a reducing gas through iron ore oxides to produce sponge iron for use in making steel is well known in the steel making art. It is known in this art that the reducing gas must be at a high temperature, such as about 1800°-2000° F., in order for the reducing gas to react with the iron ore with commercial efficiency. U.S. Pat. No. 2,900,247 discloses a method of reducing iron ore to produce sponge iron wherein a stream of reducing gas is heated by first separately heating a stream of air and continuously mixing the heated stream of air with a preheated stream of reducing gas to cause a portion of the reducing gas to be burned in order to further heat the reducing gas prior to passing the reducing gas through a bed of iron ore to reduce the ore to sponge iron. The process of U.S. Pat. No. 2,900,247 has been commercially successful. However, the cost of producing reducing gas has escalated and continues to escalate to the point of making the efficiency of use of primary reducing gas a critical factor. Due to the fact that the process of U.S. Pat. No. 2,900,247 requires that a portion of the reducing gas be combusted, the reducing gas efficiency is significantly less than ideal due to the virtual waste of reducing gas constituents as part of the combustion and heating process. A partial solution to the problem of combusting the reducing components of the primary reducing gas stream, and thus expending them, is suggested in U.S. Pat. No. 3,128,174. This patent will be described in more detail in the description of the preferred embodiment. It should be said at this point, however, that U.S. Pat. No. 3,128,174 also spends reducing gas constituents during the step of heating of the reducing gas by utilizing the reducing constituents thereof as part of the combustion process to heat the reducing gas. Both of these patents refer to a batch process for making sponge iron wherein the reducing gas is passed through a closed vessel containing a stationary load of iron ore. However, the same problems regarding the wasting of reduction constituents of the primary reducing gas applies to continuous processes such as that disclosed in U.S. Pat. No. 3,779,741. Other patents considered no more pertinent than the patents just discussed include U.S. Pat. Nos. 2,915,379; 3,136,623; 3,126,624; 3,126,625; 3,189,879; 3,265,113; 3,375,098; 3,423,201; 3,467,368; 3,601,381; 3,617,227; 3,635,456; 3,681,049; 3,684,486; 3,710,808; 3,720,497; 3,748,120; 3,749,386; 3,764,123; 3,765,872; 3,770,421; 3,814,174; 3,816,101; 3,816,102; 3,827,879; 3,836,131; 3,837,813; 3,846,066; 3,890,142; and, 3,904,397.

SUMMARY OF THE INVENTION

It is an object of this invention to provide a new and improved method and apparatus for preparing a hot reducing gas without substantial utilization of the reduction constituents of the initially preheated reducing gas.

It is further an object of this invention to heat an ore-reducing gas in an available oxygen-free environment in order to prevent spending or consuming a significant portion of the reduction constituents in the reducing gas.

It is further an object of this invention to produce a hot reducing gas by providing a heating gas for mixing with the initially preheated reducing gas which heating gas has no available oxygen and further generates additional reducing constituents upon mixing with the initially preheated reducing gas.

It should be understood that these objects may or may not be exclusive with the invention herein and that the claims of this application, after issuance in this patent, will solely represent the scope of this invention.

Applicant's invention is directed to a new and improved method for preparing a hot reducing gas prior to introduction of the reducing gas into a vessel containing ore oxide in order to reduce the ore to sponge metal. The method of this invention includes the steps of combusting a fuel with no more than a stoichiometric amount of air to produce a heating gas having an absence of available oxygen and to direct the heating gas and an initially preheated reducing gas stream to a mixing zone to thereby mix the heating gas with the initially preheated reducing gas in order to heat the initially preheated reducing gas without spending any of the reducing constituents thereof.

The apparatus of this invention is directed to a new and improved reducing gas heater system adapted for connection with a vessel containing comminuted ore oxide for preparing a hot reducing gas stream for entry into the vessel, the hot reducing gas being used to convert the ore oxide into sponge metal. The new and improved apparatus includes a heater housing having a combustion chamber and a mixing chamber. The combustion chamber includes a fuel inlet, an air inlet and an outlet for directing outwardly a heating gas produced by the combustion of the fuel and air. Flow control means are provided for providing said air in an amount not to exceed the stoichiometric amount of air for combustion of all the oxygen in the air with the fuel in the combustion chamber. The mixing chamber in the heater housing is connected to the combustion chamber by a passage means. The mixing chamber has a reducing gas inlet for receiving the initially preheated reducing gas and an outlet adapted for connection to the vessel in order to provide the vessel with a hot reducing gas wherein none of the reducing constituents of the reducing gas have been spent in the heating of the gas.

DESCRIPTION OF THE PREFERRED EMBODIMENT

Figure 1:
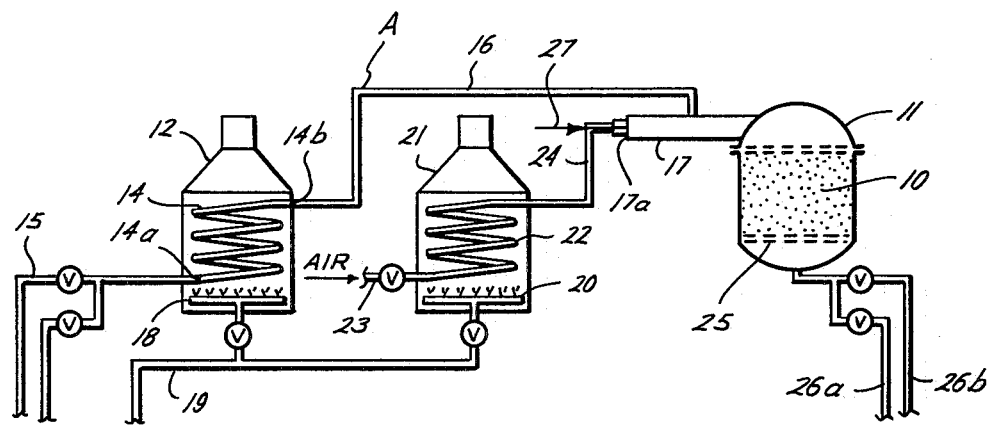
FIG. 1 is a schematic view of the prior art as illustrated in U.S. Pat. No. 3,128,174.

Referring to FIG. 1, a reduction unit A of U.S. Pat. No. 3,128,174 is illustrated as prior art. The purpose of the reduction unit A is to provide a reducing gas stream to chemically reduce iron ore 10 in reactor 11 in order to produce sponge iron. The prior art reduction unit A includes a gas preheater 12 having a heat exchange coil 14 therein. A supply line 15 for the reducing gas extends from the supply therefor (not shown) to the inlet 14a for the exchange coil 14. The heat exchange coil 14 has an outlet 14b which is connected by line 16 to a reducing gas heater 17. A burner 18 is mounted in the gas preheater 12 and is connected to supply line 19 of a gaseous hydrocarbon fuel.

The gaseous hydrocarbon fuel supply line 19 also attaches to a burner 20 located in preheater 21. The preheater 21 includes a heat exchange coil 22 which is attached to an air supply line 23 at its inlet and to line 24 at its outlet. Line 24 extends into the gas preheater 17 as end 17a thereof. The iron ore 10 is supported on a grate 25 within the reactor 11. The reactor 11 has connected thereto reactor outlet lines 26a and 26b which receive the reducing gas after the gas has passed over the bed of iron ore 10. The reducing gas is principally comprised of hydrogen and carbon monoxide which may be prepared in various known ways known to those of skill in this field of technology. The reducing gas reacts with the iron ore 10 and reduces the oxides of such iron ore in order to produce a sponge iron which may be used in the process of making steel in a known manner.

The source of the reducing gas supplied to line 15 may be several. According to U.S. Pat. No. 3,128,174, if the ore treatment is performed in an area where natural gas is available, the natural gas is mixed with steam and catalytically converted to hydrogen and carbon monoxide in accordance with known commercial processes. Alternately, the reducing gas may be formed by a known water-gas reaction used to produce a gas mixture of the desired composition, a typical reducing gas having approximately the following composition: hydrogen 72%; carbon monoxide 14%; carbon dioxide 7%; methane 5%; water 1%; and nitrogen 1%. A tube (arrow) 27 extends through a portion of air line 24 and into the heater apparatus end 17a. The tube 27 is connected to a source of gaseous hydrocarbon fuel.

The operation of the unit disclosed in U.S. Pat. No. 3,128,174 is as follows. The reducing gas 15 is passed through the gas preheater 12 and delivered through line 16 to the gas heater 17. Simultaneously, a gaseous hydrocarbon fuel such as methane is directed through gas tube 27 into the chamber for the heater apparatus 17 and air, preheated by preheater 21, is provided through line 24. The gaseous fuel and preheated air combust within the gas heater 17. The amount of air in proportion to the amount of gaseous fuel is such that some air is not combusted with the gaseous hydrocarbon such that a combustion products mixture having oxidizing constituents is produced, that is, a mixture of combustion products and air which includes oxygen available for reacting with the reducing gas constituents. The oxidizing mixture and combustion products are mixed with the preheated reducing gas and a portion of the reducing gas is combusted with the excess reactionable oxygen in the combustion products mixture thereby reportedly raising the temperature of the reducing gas to the range of 1800° F. to 2250° F. Insofar as known, the specific process of U.S. Pat. No. 3,128,174 has not been practiced commercially. One certain disadvantage of the process described in U.S. Pat. No. 3,128,174 is the fact that it is necessary to combust part of the reducing gas stream itself in order to raise the temperature to the desired level. Such combustion of the reducing gas stream itself causes a spending of some of the reducing constituents thereby reducing the overall reduction strength of the primary reducing gas. Another disadvantage is the necessity of preheating the air, such indirect air preheaters being generally inefficient and energy-consuming.

Figure 2:
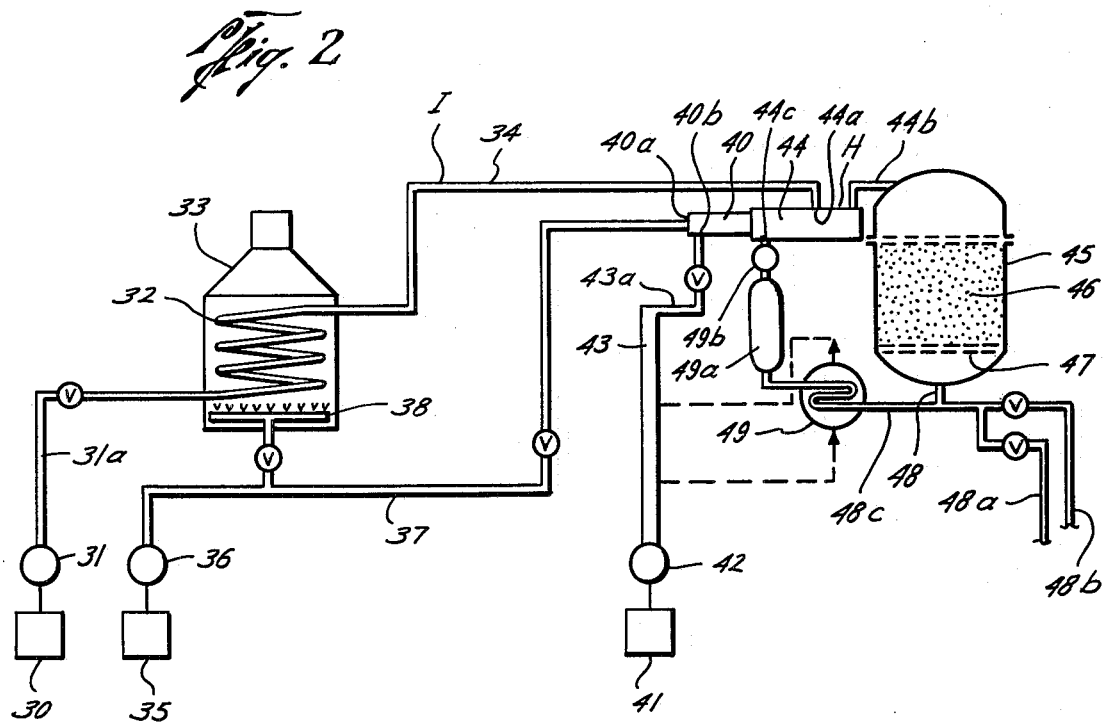
FIG. 2 is a schematic view illustrating the method and apparatus of the present invention for preparing a hot reducing gas stream prior to entry into an iron ore containing vessel or reactor.

The new and improved method and apparatus of preparing a hot reducing gas for use in converting iron ore to sponge iron is illustrated in FIG. 2. Although the preferred embodiments are described in application to the reduction of iron ore, it is within the scope of this invention to use the method and apparatus herein described for the reduction of various types of ore oxides to produce sponge metal. In FIG. 2, the letter I designates the new and improved reduction unit of the preferred embodiment of this invention in schematic form. Referring to FIG. 2, the number 30 designates a supply of reducing gas which may be produced in any suitable manner. The reducing gas is compressed by compressor 31 and is directed through line 31a and to heat exchange coil 32 in gas preheater 33. The preheated reducing gas is passed out of the heat exchange coil into line 34 which is connected to a new and improved reducing gas heater H of this invention.

A fuel supply 35 is pumped through compressor 36 to line 37. The fuel may be any gaseous hydrocarbon. Line 37 is connected to burner 38 for the preheater 33 and also extends to fuel inlet 40a of combustion chamber 40 of the reducing gas heater H.

An air supply 41 is pumped through compressor 42 to air supply line 43. The air supply line 43 is connected through line 43a to air inlet 40b of the combustion chamber 40 for the heater H. The air for inlet 40b may be heated such as by passing the air from line 43 through a heat exchanger (not shown).

The reducing gas heater H further includes a mixing chamber 44 which has reducing gas inlet 44a connected to receive preheated reducing gas through line 34. A mixing chamber outlet 44b is attached to batch reactor 45. The batch reactor is adapted to have mounted therein iron ore 46 which is supported on grate 47.

Reactor outlet line 48 extends to outlet lines 48a and 48b that may extend to a tail gas collector for reuse or the like. Reactor outlet line 48 is further connected to line 48c which extends through a heat exchange unit 49, a quench unit 49a and compressor 49b to connect to a recirculation inlet 44c for the mixing chamber 44.

Figure 3:
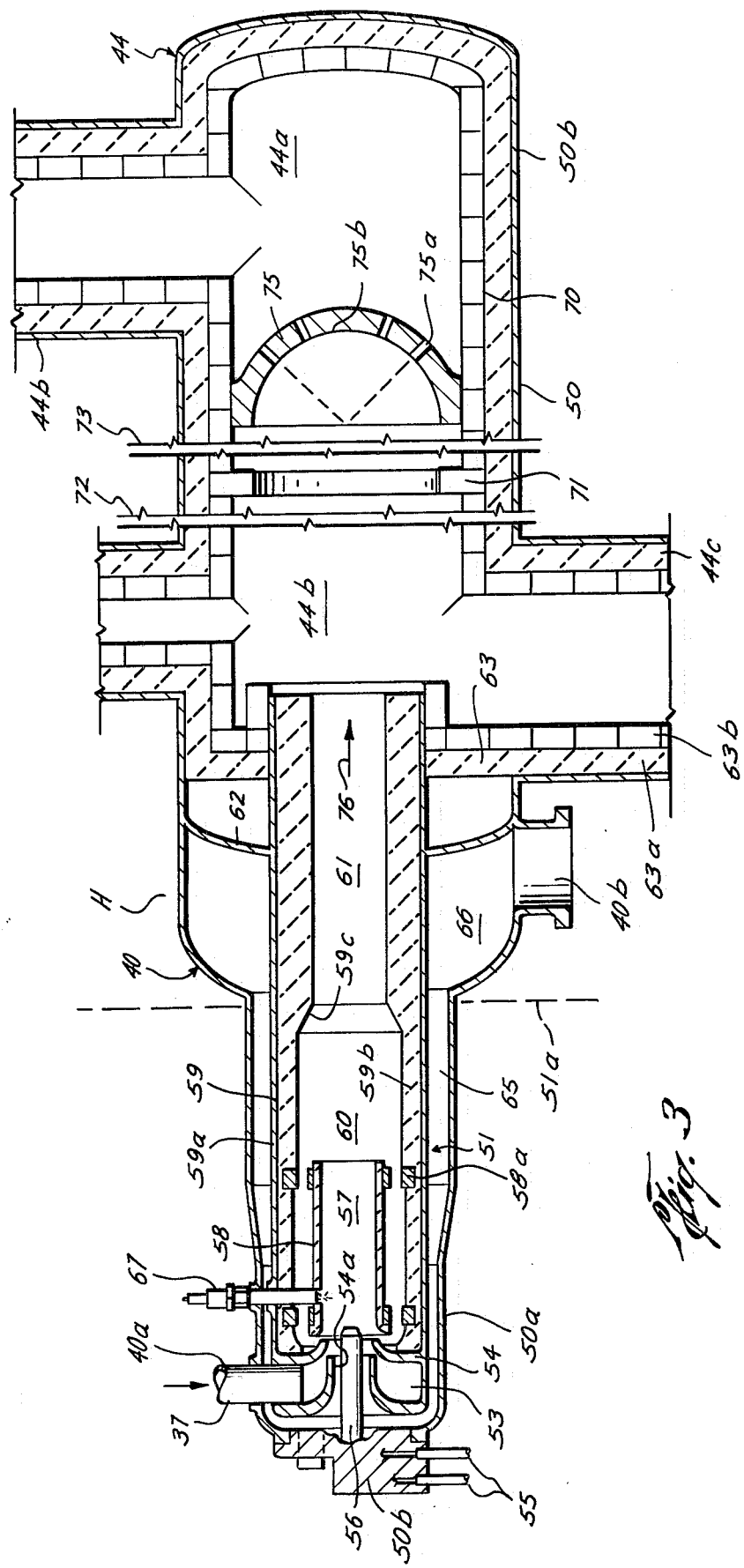
FIG. 3 is a side view in cross section of the reducing gas heater of the preferred embodiment of this invention; and, FIG. 4 is a chart illustrating reasonably predictable performance of this invention as compared to prior art.

Referring now to FIG. 3, a cross-sectional view of the reducing gas heater H is illustrated in detail. The reducing gas heater H includes a housing or shell 50 having the following inlets and outlets already identified in relation to FIG. 2: fuel inlet 40a; air inlet 40b; reducing gas inlet 44a; recirculation gas inlet 44c; and, mixing chamber outlet 44b. Each of these inlets and outlets are points of connection between various supply lines such as, for example, inlet 40a of the housing 50 is attached to fuel line 37. It is within the skill of the art to make such connections in any known manner. For example, the connection forming the air inlet 40b is a flange connection. The heater shell 50 is made of any suitable metal capable of withstanding operating pressures and temperatures as discussed herein. Both the combustion chamber 40 and the mixing chamber 44 are mounted within the shell 50.

The combustion chamber 40 includes a burner assembly generally designated as 51 which is basically known in the art. For example, the burner assembly 51 may be substantially identical to the THERMO HV Vortex burners manufactured by Research and Engineering Corporation, Conshohocken, Pa. The burner assembly 51 basically forms the lefthand side of the heater H up to about line 51a. Burner shell 50a of burner assembly 51 is generally cylindrical in a cross-sectional view taken along line 51a, and includes a fuel inlet tube 37 that extends through the burner shell 50a into an annular burner plenum chamber 53 formed by a doughnut-shaped, hollow element 54 of suitable refractory material 54. Lines 55, mounted in shell block end 50b, are used whenever a liquid fuel is utilized. The lines 55 are in fluid connection with atomizer 56 for spraying outwardly the liquid fuel in a gas form. For the purposes of this disclosure, a gaseous hydrocarbon fuel such as methanol is delivered through line 37; however, other fuels such as methane, hydrogen or carbon monoxide may be used. A vaporization chamber 57 is formed by vaporization tube 58 which is held in place by suitable annular brackets 58a seated in an elongated cylindrical duct 59. The elongated cylindrical duct 59 is formed integrally with the doughnut-shaped element 54. The duct 59 includes a cylindrical shell 59a and has an interior liner 59b, both made of suitable refractory material capable of withstanding high temperatures. The interior liner 59b forms a combustion area 60 and converges at 59c to form a smaller diameter area 61. The duct 59 is supported in an annular interior support shell member 62. The duct 59 extends through a transverse refractory wall 63 which is formed of insulating refractory material 63a and refractory brick 63b. Liner 63a may be any suitable insulating refractory material and liner 63b, whether brick or other refractory material, is a suitably temperature resistant material. The refractory wall 63 separates the combustion chamber 40 from the mixing chamber 44 with the duct 59 forming duct area 60 for providing fluid communication between the chambers 40 and 44.

An outer annular air path 65 is formed between outer duct wall 59a and the burner shell 50a. The outer annular air path 65 opens to air entry plenum chamber 66 at the point of air entry 40b. Air entering through inlet 40b flows along the annular air path 65 and enters the combustion area 60 through central opening 54a formed by the doughnut-shaped element 54. The combustion is ignited by electrode 67. As the air passes from air inlet 40b along the annular path 65, the air serves to cool the outside burner shell 50a and at the same time, is preheated by the high temperature of combustion occurring in combustion area 60. The gaseous products of combustion of the fuel from line 37 and air from line 40 combusted in areas 57 and 60 are designated as "heating gas" for heating the preheated reducing gas in mixing chamber 44. The amount of air supplied to inlet 40b is controlled by the supply 41 and valve 42, which is any suitable flow control valve. The volume or rate of flow of the air stream delivered to inlet 40b is limited to no more than a stoichiometric amount of air as compared to the volume of gaseous fuel delivered to gas inlet 40a by any suitable air flow control valving or metering (not shown).

In this manner, the combustion occurring in areas 57 and 60 between the air and fuel is such that all the available oxygen in the air is expended in the combustion process itself. This type of combustion eliminates any oxygen which would otherwise be available to react with the constituents of the preheated reducing gas. The heating gas produced by the combustion is delivered from area 60 to the duct 61. The smaller diameter of duct 61 causes a pressure drop serving to enhance turbulent mixing as the heating gas flows into the mixing chamber 44. The heating gas consists of typical products of combustion including nitrogen carbon dioxide and water. Since the volumetric amount of air is strictly limited to less than an equal stoichiometric amount of air only, there is no available oxygen in the products of combustion (heating gas) that is free to react with the reducing gas also flowing into chamber 44.

The mixing chamber 44 is also generally cylindrical and is defined by the portion 50b and includes reducing gas inlet 44a, recirculating gas inlet 44c and mixing chamber outlet 44b.

An interior refractory wall 70 is formed throughout the mixing chamber shell 50b. The interior refractory wall 70 for the mixing chamber may include a layer of any suitable refractory material which is the same as layer 63a of wall 63 and an inside layer of refractory brick 63b. An annular member 71 of refractory brick or other material is mounted in the layer of refractory brick which forms part of the wall portion 70. The spaced lines at 72 and 73 are intended to show that the distance between the lines in actuality may be larger than illustrated.

A hemispherical or dome-shaped barrier 75 is mounted between the annular member 71 and the mixing chamber outlet 44b. The dome-shaped member 75, which is curved as viewed from the side cross-sectional view of FIG. 3, has a plurality of openings 75a therein. The openings 75a are generally radial in direction and are designed to direct radially outwardly a mixture of the reducing gas from inlet 44 and the heating gas from the duct 59. The center portion 75b of the dome-shaped member has no openings in order to impinge and further diffuse the heating gas and reducing gas as it approaches the dome-shaped member 75. The barriers 75 and 71 act to further mix and direct outwardly into mixing chamber portion 44a a substantially mixed gas which flows outwardly of the outlet 44b into the reactor 45.

As previously mentioned, the amount of air is less than or equal to a stoichiometric amount. When the amount of air is a stoichiometric amount, the combustion which occurs within the combustion area 60 is stoichiometric. In this manner, the heating gas produced by the combustion of the fuel gas through inlet 40a and the air directed through opening 54a has no excess oxygen in it. The heating gas is directed outwardly in the direction of arrow 76 through duct portion 61 and flows into initial mixing area 44b of the mixing chamber 44.

The heating gas from duct portion 61 is mixed with the stream of preheated reducing gas in the initial mixing chamber area 44b. As the initially mixed gases flow through restricted portion 71, continued mixing occurs. Finally, the gases impinge against the solid center portion 75b of the dome-shaped wall 75 and are directed outwardly through radially directed openings 75a into the mixing chamber area 44a and then outwardly through outlet 44b into the reactor 45.

The flow of heating gas and the flow of reducing gas through inlet 44a is controlled such that the temperature of the mixed reducing gas going out of outlet 44b is sufficiently high to effectively reduce the material in vessel 45.

It is well known in the art of producing sponge iron that, within certain limits, the greater the temperature of the reducing gas entering the reactor 45, the faster the rate of the reduction reaction. There is a practical upper limit—the fusion or sintering temperatures of the iron ore. These temperatures of the iron ore are somewhat dependent upon the size and the actual composition of the iron ore being reduced; therefore, we are limited to speaking with some generality. However, it is the goal of this invention to be able to deliver to the reactor 45 sufficiently hot reducing gas without causing the iron ore to fuse or sinter and without consuming any portion of the reducing constituents of the reducing gas. The flow rate of the preheated reducing gas is adjusted with respect to the flow rate of the heating gas flowing through duct portion 61 in order to attain temperatures within that range. Should further cooling be desirable or necessary due to the nature of the iron ore or the like, the spent tail gas, recirculated and treated before entering recirculation inlet 44c may be mixed in desired flow rate proportions with the heating gases and the reducing gas to reduce the temperature if necessary.

When the flow rate or volume of air delivered through inlet 40b for combustion with the gaseous fuel delivered through inlet 40a is limited to a stoichiometric amount or less of air, the flow rate of air is limited such that the oxygen in the air will be burned by the combustion. In this manner, the heating gas delivered through the duct portion 61 has no free oxygen to react with the reducing gas constituents of the preheated reducing gas delivered at 44a. Therefore, no appreciable amount of the reducing constituents of the reducing gas are spent or wasted by combusting with the heating gas in attempting to attain a sufficiently high temperature prior to entry to the reactor 45. Rather, utilizing the method and apparatus of this invention, the temperature for the hot reducing gas is attained without spending any of the reducing constituents of the reducing gas. Utilizing the reducing gas heater H of the preferred embodiment of this invention, combustion occurs within the combustion area only and is entirely complete prior to any mixing taking place.

Therefore, a limitation on the amount of air provided for combustion is critical. Whether "stoichiometric" combustion, which may not be fully practical in commercial apparatus, actually takes place or not, as the term is used here, "stoichiometric" means that no substantial amount of oxygen containing substance is present in the heating gas. It is thus necessary to limit the flow of air delivered to such an amount that the oxygen therein will be fully combusted in the combustion area 60 prior to mixing with the reducing gas.

The method of this invention also achieves other surprising results by adjusting the flow rate of fuel and air appropriately. It has been described that use of no more than a stoichiometric amount of air prevents the spending of any of the reducing constituents of the preheated reducing gas.

In addition, an increase, as compared to some known prior art flow rates, in the flow rate of fuel to an excess of stoichiometric fuel will cause the resultant combusted heating gas to form additional reducing constituents for addition to the preheated reducing gas.

Therefore, it is further within the scope of this invention to vary the amount of gaseous hydrocarbon fuel delivered at inlet 40a in amounts from 100% to about 120% of the stoichiometric amount of gaseous hydrocarbon needed. In this manner, an excess of gaseous hydrocarbon is reacted to produce hydrogen and carbon monoxide, which increases the reducing strength of the heating gas. The addition of amounts of gaseous hydrocarbon fuel in excess of a stoichiometric amount will tend to reduce the temperature attained in the combustion area 60 but will add to the volume of reducing constituents available to reduce the iron ore. An excess of other fuels such as those mentioned can also be mixed with the oxygen to produce a heating gas with stronger reducing characteristics.

The beneficial and surprising effects of the method and apparatus of this invention are illustrated in the graph of FIG. 4. In FIG. 4, the abscissa 80 represents air volume and the ordinate 81 represents volume of reducing constituents produced. Base curve 82 represents a curve at least approximately representative of a comparison of a volume of reducing gas produced versus air volume for the process of U.S. Pat. No. 2,900,247. Curve 83 represents the practice of this invention wherein the fuel is methanol with stoichiometric amount of air being mixed with methanol to produce a heating gas having no excess oxygen to combust with the primary reducing gas prior to entry into the reactor 45. Curve 84 illustrates the utilization of 120% of the stoichiometric amount of methanol as mixed with air to produce a heating gas having an additional volume of reducing gas constituents to be added to the primary reducing gas during mixing of the produced heating gas with the primary reducing gas prior to entry into the reactor 45. Curve 85 illustrates the use of methane as mixed in stoichiometric proportions with air to produce a reducing gas having no available oxygen for reaction with the primary reducing gas; and, curve 86 illustrates the mixing of 120% stoichiometric methane with air to produce a heating gas having an additional volume of reducing gas constituents for mixing with the primary reducing gas. These curves have been developed utilizing computer models and are thus representative of the increase in the volume of reducing gas produced for the same levels of oxygen input. Although there may be some inaccuracies in the comparison since it is a mathematical model, it is thought that the improved processes as illustrated in curves 83–86 clearly indicates that the utilization of the concepts of this invention to eliminate available oxygen from the heating gas all produce a more efficient utilization of the primary reducing gas utilized in the iron ore reduction process.

The foregoing disclosure and description of the invention are illustrative and explanatory thereof, and various changes in the size, shape and materials as well as in the details of the illustrated construction may be made without departing from the spirit of the invention.

I claim:

1. A method of producing a stream of hot reducing gas for introduction of said hot reducing gas into a vessel containing comminuted ore oxides to produce reduced metal, comprising the steps of:
   combusting a fuel with air in such proportions to produce a heating gas having an absence of free oxygen; and
   directing said heating gas and an initially preheated reducing gas stream to a mixing zone to mix said heating gas with said preheated reducing gas to produce a hot reducing gas stream at a temperature below the fusion point of such ore oxides without spending any of the reducing constituents in said initially preheated reducing gas stream for introduction of said hot reducing gas stream into such vessel containing comminuted ore oxide to convert said ore oxides to reduced metal.

2. The method set forth in claim 1, including the step of:

combusting a stoichiometric amount of air with said fuel in order to produce a heating gas having no free oxygen for heating said initially preheated reducing gas stream without expending any of the reducing strength thereof.

3. The method set forth in claim 1, including the step of:

recirculating a portion of said hot reducing gas stream after exposure to said comminuted ore oxide for mixing said recirculated gas with said heating gas and said initially preheated reducing gas to control the temperature of said resultant hot reducing gas stream.

4. The method set forth in claim 1, including the step of:

combusting a fuel in excess of a stoichiometric amount with a stoichiometric proportion of air to produce a heating gas having additional reducing constituents in order to further enhance the reducing capability of the mixture of said initially preheated reducing gas and said heating gas.

5. The method set forth in claim 1, wherein:

said amount of fuel is in the range of 100% to 120% of the stoichiometric requirements for the incoming air.

6. A reducing gas heater system adapted for connection with a vessel containing comminuted ore oxide for preparing a hot reducing gas stream for entry into said vessel, said hot reducing gas stream being used to convert said ore oxide into reduced metal, comprising:

a heater housing having a combustion chamber including a fuel inlet for receiving a fuel and an air inlet for receiving air;

flow control means for providing said air to said combustion chamber in an amount not to exceed the stoichiometric volume of air for combustion of all the oxygen in said air with said fuel in said combustion chamber whereby a heating gas free of available oxygen is produced; and said heater housing further having a mixing chamber including a passage means in fluid communication with said combustion chamber, a reducing gas inlet for receiving initially preheated reducing gas and an outlet adapted for connection to such vessel in order to provide to such vessel a hot reducing gas wherein none of the reducing constituents of said initially preheated reducing gas have been spent in heating of same.

7. The structure set forth in claim 6, wherein said flow control means includes:

means for supplying a stoichiometric amount of fuel to said combustion chamber to mix with a stoichiometric amount of air.

8. The structure set forth in claim 7, wherein said flow control means includes:

means for supplying an excess of a stoichiometric amount of fuel for mixing with said stoichiometric amount of air for producing a heating gas having an absence of oxygen and some reducing capability.

9. The structure set forth in claim 6, including:

said mixing chamber having mounted therewith a recirculation gas inlet; and means for supplying a recirculation gas which is cooled after passing through said vessel in order to control the temperature in said mixing chamber.

10. The structure set forth in claim 6, including:

said mixing chamber having mounted therein a wall portion having openings therein, said wall portion being positioned between said reducing gas inlet and said mixing chamber outlet so that said heating gas and reducing gas must pass through said openings to reach said mixing chamber outlet.

11. The structure set forth in claim 10, wherein:

said wall portion is hemispherical in configuration and has openings radially directed to enhance mixing of said heating gas and reducing gas.

* * * * *